United States Patent
Wasynczuk

(12) 
(10) Patent No.: US 6,228,536 B1
(45) Date of Patent: May 8, 2001

(54) LITHIUM-ION BATTERY CELL HAVING AN OXIDIZED/REDUCED NEGATIVE CURRENT COLLECTOR

(75) Inventor: James A. Wasynczuk, Bellflower, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/353,005

(22) Filed: Jul. 13, 1999

(51) Int. Cl.[7] ............................. H01M 4/64; H01M 4/72; B23P 13/00

(52) U.S. Cl. .................... 429/233; 429/231.95; 429/245; 29/2; 29/623.1; 29/623.5

(58) Field of Search ............................ 429/231.95, 231.8, 429/231.3, 233, 245; 29/2, 623.1, 623.5

(56) References Cited

U.S. PATENT DOCUMENTS

| | | | |
|---|---|---|---|
| 5,436,091 | * | 7/1995 | Shackle et al. ................. 429/192 |
| 5,635,138 | * | 6/1997 | Amatucci et al. ................ 422/104 |

* cited by examiner

*Primary Examiner*—Carol Chaney
*Assistant Examiner*—Angela J. Martin
(74) *Attorney, Agent, or Firm*—T. Gudmestad

(57) ABSTRACT

A lithium-ion battery cell assembly includes a negative electrode having a negative current collector contacting a negative electrode active material. The negative current collector is prepared by providing a piece of a negative current collector metal, thereafter oxidizing the piece of the negative current collector metal, and thereafter reducing the piece of the negative current collector metal. The negative electrode is assembled with a positive electrode with an intermediate separator. An electrolyte saturates the electrodes and the separator, and provides a lithium ion path between the negative electrode and the positive electrode.

17 Claims, 4 Drawing Sheets

LITHIUM-ION BATTERY CELL HAVING AN OXIDIZED/REDUCED NEGATIVE CURRENT COLLECTOR

BACKGROUND OF THE INVENTION

This invention relates to batteries, and, more particularly, to the negative current collector in a lithium ion battery cell.

A typical lithium ion battery cell includes a negative electrode, a positive electrode, a separator between the negative electrode and the positive electrode, and an electrolyte that saturates the separator and provides a lithium ion path between the negative electrode and the positive electrode. The negative electrode has a negative current collector contacting the negative electrode active material, and a positive current collector contacting the positive electrode active material. The negative electrode active material releases lithium ions upon discharging of the battery cell and absorbs lithium ions upon charging of the battery cell. The positive electrode active material reacts with lithium ions upon discharging of the battery cell and releases lithium ions upon charging of the battery cell. A lithium ion battery incorporates at least two, and typically a large number, of these cells within a container.

Each current collector provides an electrical current flow path between its respective electrode active material and a terminal, and thence to an external circuit. The current collector is a metal that is resistant to corrosion in the electrolyte, typically copper for the negative current collector and aluminum for the positive current collector. There must be good mechanical adhesion between each of the current collectors and its respective active material. A low electrical resistance at the interface between the current collector and the active material is also important, because the interface is in series with the current flow and imposes an interface impedance on the current flow.

Simultaneously achieving low electrical resistance and good mechanical adhesion between the current collector and the active anode material has been a problem for the case of the copper negative current collector. In one approach, a thin film is applied overlying the copper negative current collector to promote low electrical resistance and good adhesion. However, it is difficult and expensive in a production setting to apply the required thin coating in a precise, controllable, reproducible manner.

There is a need for an improved lithium-ion battery cell in which the interface between the negative current collector and the anode active material has both good adhesion and a low electrical resistance, and which is readily fabricated in production. The present invention fulfills this need, and further provides related advantages.

SUMMARY OF THE INVENTION

The present invention provides a negative current collector useful in a lithium-ion battery, a battery cell assembly using the negative current collector, and a method for their fabrication. The interface between the negative current collector and the negative-electrode active material exhibits both good adhesion and also low electrical resistance. The present invention is compatible with a wide variety of configurations of the negative current collector and of the lithium-ion battery assembly. The approach of the invention is precise, controllable, and reproducible, and is readily applied in a production setting.

In accordance with the invention, a battery cell assembly comprises a battery cell having a negative electrode including a negative-electrode active material that releases lithium ions upon discharging of the battery cell and accepts lithium ions upon charging of the battery cell, and a negative current collector (preferably copper) contacting the negative-electrode active material. The negative current collector has an oxidized/reduced surface, which is preferably prepared by oxidizing a piece of the negative current collector metal, and thereafter reducing the piece of the negative current collector metal. The battery cell further includes a positive electrode comprising a positive-electrode active material that accepts lithium ions upon discharging of the battery cell and releases lithium ions upon charging of the battery cell, and a positive current collector (preferably aluminum) contacting the positive-electrode active material. A separator is disposed between the negative electrode and the positive electrode. The separator is electrically nonconductive to prevent contact between the negative electrode and the positive electrode but is permeable to lithium ions. An electrolyte saturates the electrodes and the separator and provides a lithium ion path between the negative electrode and the positive electrode.

The oxidized/reduced surface on the negative current collector is preferably prepared by immersing a clean and lightly etched negative current collector in an aqueous solution comprising an oxidizer, and thereafter immersing the copper negative current collector in an aqueous solution comprising a reducing agent. Etching prior to oxidation is preferably accomplished by immersing the negative current collector metal into an acidic aqueous solution. The etching solution may contain sulfuric acid and hydrogen peroxide. The oxidizer may be sodium chlorite, and the reducer may be dimethylamineborane.

The treatment of the surface of the negative current collector is easily practiced and is reproducible. The surface of the negative current collector exhibits good adhesion to the anode active material, and also low electrical resistance. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 5A–5C are enlarged, idealized elevational schematic views of the copper negative current collector of the lithium-ion battery cell assembly, wherein FIG. 5A illustrates the as-provided negative current collector metal, FIG. 5B illustrates the negative current collector metal after oxidation, and FIG. 5C illustrates the negative current collector metal after reduction.

DETAILED DESCRIPTION OF THE INVENTION

Figure 1:
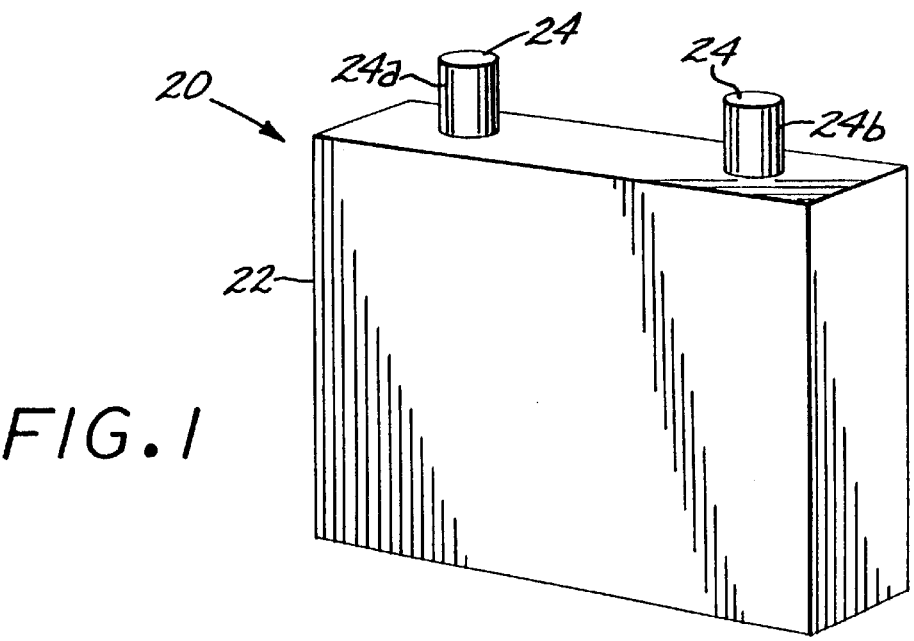
FIG. 1 is a perspective view of a preferred form of a battery made according to the present invention.

A battery cell assembly 20 according to the present invention is illustrated in FIG. 1. The battery cell assembly 20 includes a container 22 that is hermetically sealed against leakage of the contents of the container and against intrusion of external elements. External terminals 24, including a positive terminal 24a and a negative terminal 24b, extend through one face of the container 22 to provide external connections.

Figure 2:
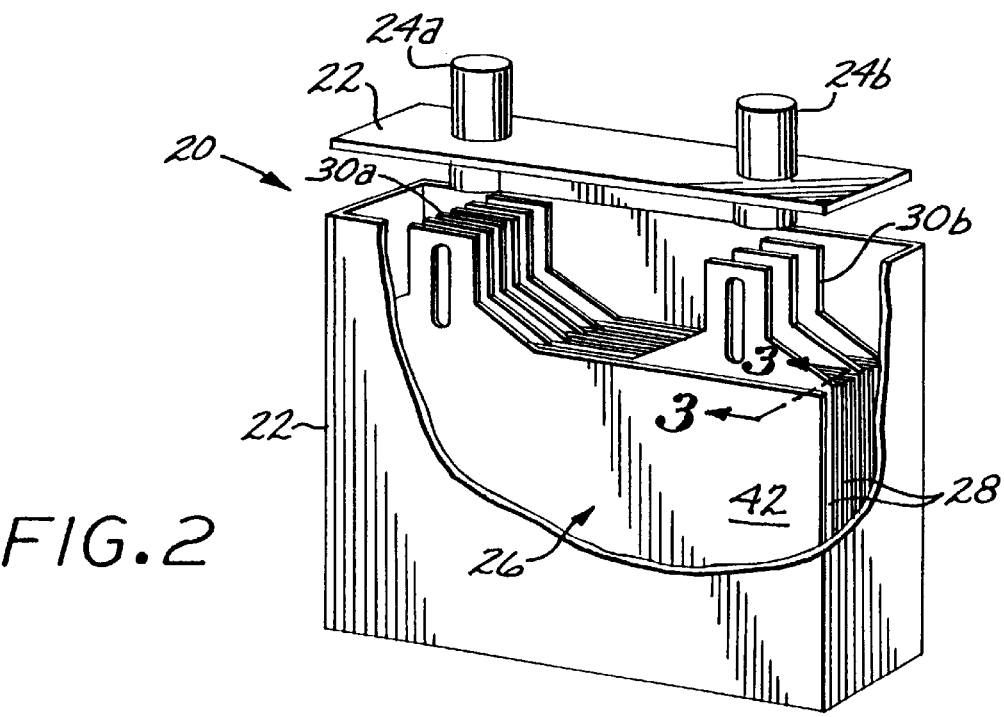
FIG. 2 is a perspective partially exploded view of the battery of FIG. 1, with a portion of the wall of the container cut away.
Figure 3:
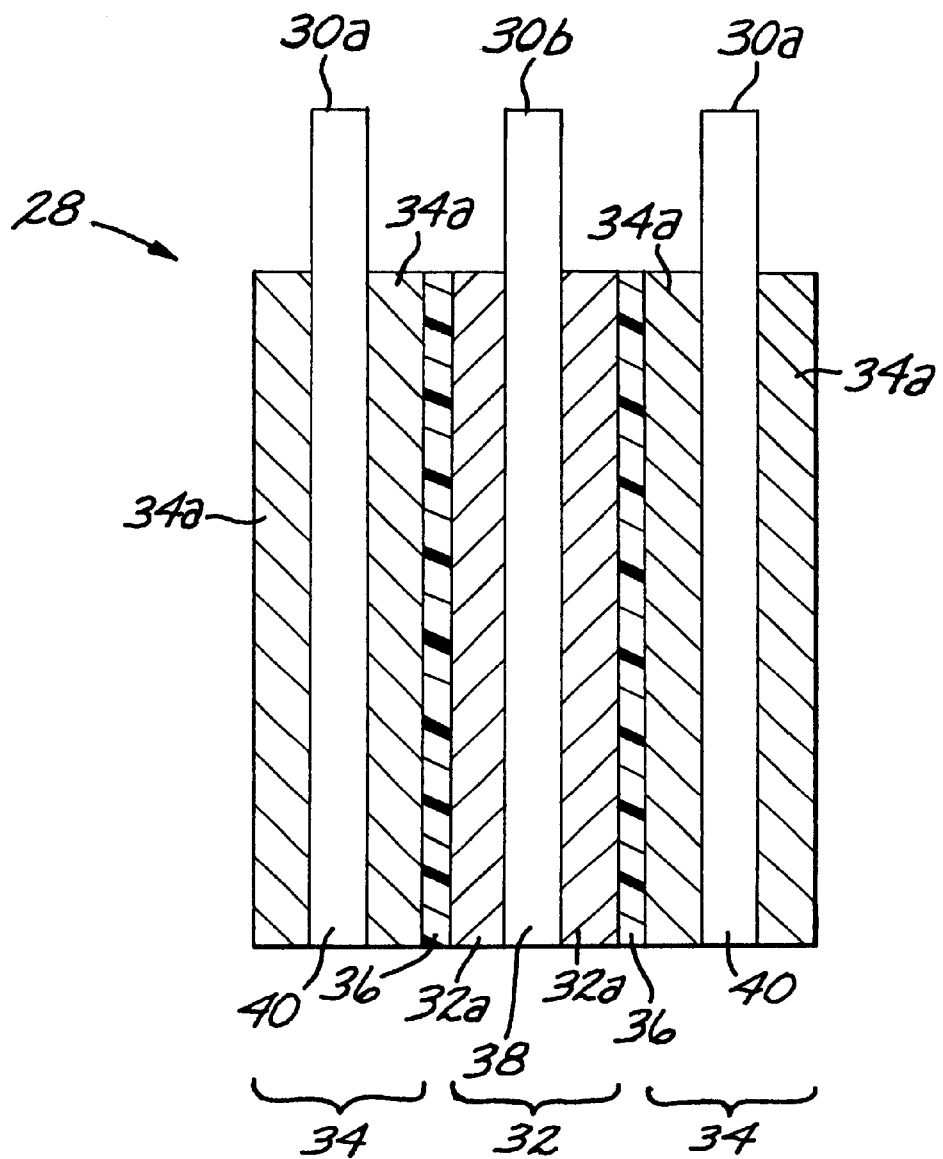
FIG. 3 is a schematic side sectional view of a lithium-ion battery cell, taken on lines 3—3 of FIG. 2.

A plate stack 26 inside the container 22 is shown in FIG. 2, and the components and arrangement of the plate stack 26 are illustrated in FIG. 3. The plate stack 26 includes a plurality of individual battery cells 28, with individual electrode connector tabs 30 extending from the cells 28. The electrode connector tabs 30 include a set of positive electrode connector tabs 30a and a set of negative electrode connector tabs 30b. The positive electrode connector tabs 30a are in electrical communication with the positive terminal 24a, and the negative electrode connector tabs 30b are in electrical communication with the negative terminal 24b.

Each battery cell 28 includes a negative electrode 32, a positive electrode 34 (and preferably two positive electrodes 34, as illustrated), and a separator 36 disposed between and contacting the negative electrode 32 and the positive electrode 34. The negative electrode 32 includes a negative current collector 38 and a layer of negative-electrode (anode) active material 32a supported on each side thereof. The negative electrode active material 32a releases lithium ions upon discharging of the battery cell and accepts lithium ions upon charging of the battery cell. The positive electrode 34 includes a positive current collector 40 and a layer of positive-electrode (cathode) active material 34a supported on each side thereof. The positive electrode active material 34a accepts lithium ions upon discharging of the battery cell and releases lithium ions upon charging of the battery cell. The separator 36 is electrically nonconductive to prevent contact between the negative electrode and the positive electrode but is permeable to lithium ions. An electrolyte 42 saturates the electrodes 32 and 34, and the separator 36, and provides a lithium ion path between the negative electrode 32 and the positive electrode 34.

The negative current collector 38 and its negative electrode active material 32a, the positive current collector 40 and its positive electrode active material 34a, the separator 36, and the electrolyte may be made of any operable materials and have any operable physical arrangement. A wide variety of operable materials and physical arrangements are known in the art. The preferred approach of the present inventor for these elements is that developed by Bell Communications Research (Bellcore), and described, for example, in U.S. Pat. No. 5,470,357, 5,456,000, and 5,429,891, whose disclosures are incorporated by reference. The presently most preferred dimensions and materials of construction of these elements are a 0.002 inch thick negative electrode 32 made of a copper negative current collector 38 with a thin film on each side thereof of carbon-containing negative electrode active material 32a made of carbon particles in a polymer binder that is porous to the electrolyte, preferably polyvinylidene fluoride; a 0.002 inch thick positive electrode 34 made of an aluminum positive current collector 40 with a thin film on each side thereof of $LiCoO_2$-containing positive electrode active material 34a made of $LiCoO_2$ particles and conductive carbon particles in a polymer binder that is porous to the electrolyte, preferably polyvinylidene fluoride; 0.002 inch thick separators 36 made of a hybrid polymer of silica particles in a polymer binder that is electrically nonconducting but is porous to the electrolyte, preferably polyvinylidene fluoride; and an electrolyte of 1 molar $LiPF_6$ in a 2:1 mixture by volume of ethylene carbonate and dimethyl carbonate. (As used herein, reference to a metal includes the pure metal and its alloys, unless otherwise indicated. That is, "copper" includes pure copper and alloys of copper.) These dimensions and materials of construction are presented by way of illustration of the preferred embodiment and are not limiting of the invention, which is applicable to other forms of lithium-ion battery cells as well.

Electrical current is carried to and from the negative electrode 32 of each battery cell 28 through the negative electrode connector tab 30b. Electrical current is carried to and from the positive electrode 34 of each battery cell 28 through the positive electrode connector tab 30a. In the approach of the present invention, the negative electrode connector tab 30b extends upwardly from and is integral with the negative current collector 38, and the positive electrode connector tab 30a extends upwardly from and is integral with the positive current collector 40.

Figure 4:
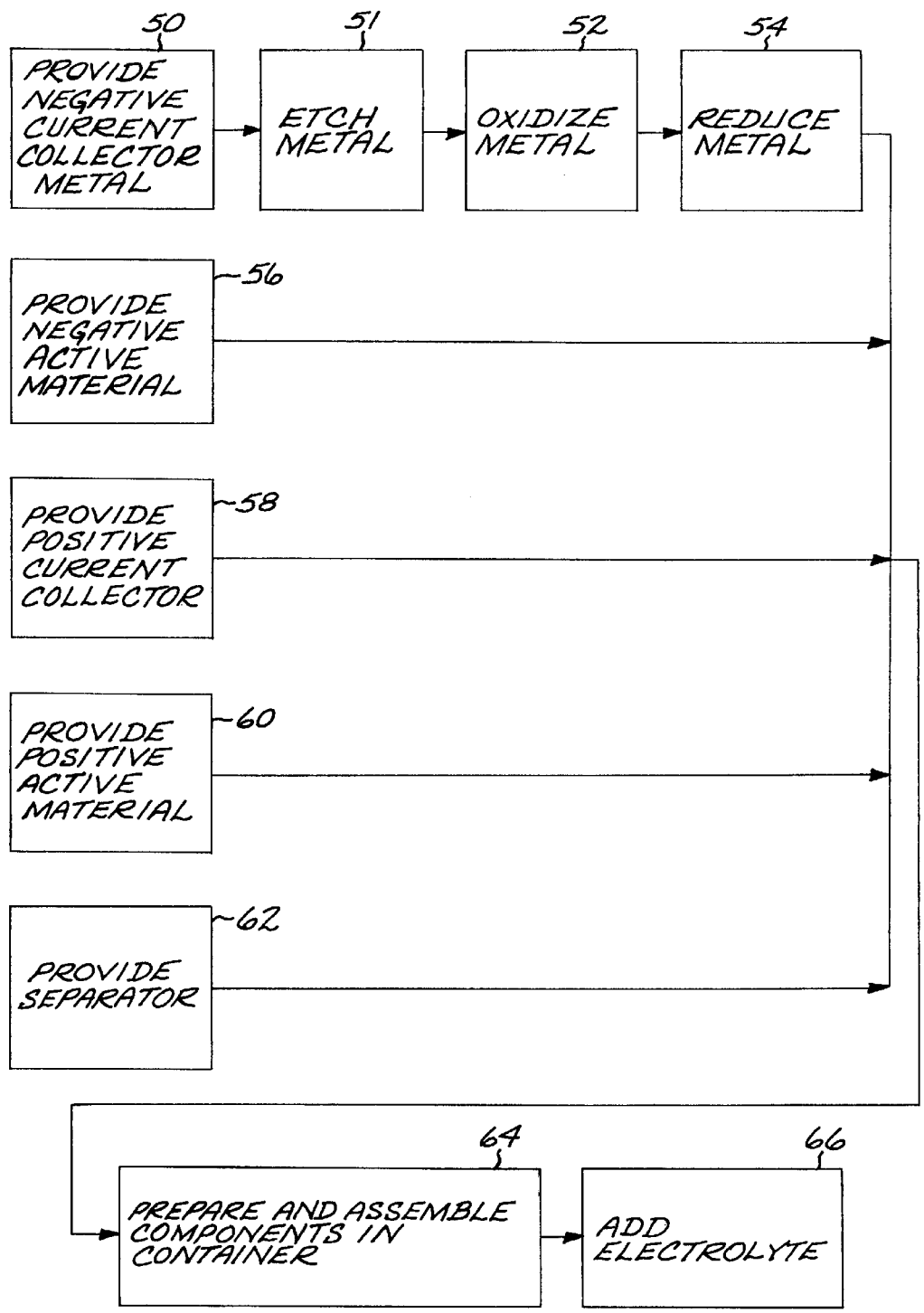
FIG. 4 is a block flow diagram of a method for practicing the invention.

FIG. 4 illustrates a preferred approach for preparing the negative current collector 38 and the battery cell assembly 20. A clean negative current collector metal, preferably copper, is provided in the required shape, numeral 50. The negative carrier metal is thereafter lightly etched, numeral 51, to prepare it for the subsequent oxidation process. As used herein, "etching" means to dissolve a very slight amount of metal from the surface, and cause a small increase in microscopic surface roughness, principally by revealing the grain structure of the metal. Etching may be accomplished by any operable approach. In the preferred approach, etching is accomplished by immersing the piece of negative current collector metal in an aqueous etching solution. An operable etching solution comprises about 6–20 percent by volume sulfuric acid and about 2–9 percent by volume hydrogen peroxide. Etching is accomplished at about 80–125° F for an immersion time of about 1–5 minutes.

After rinsing in water, the negative current collector metal is thereafter oxidized, numeral 52. As used herein, "oxidation" means reacting a metal such that metal oxides are produced. Oxidation may be accomplished by any operable approach. In the preferred approach, the oxidation is accomplished by immersing the piece of the negative current collector metal in an aqueous solution comprising an oxidizer, preferably sodium chlorite. An operable oxidizer solution is alkaline, contains about 2–200 (preferably 160) grams per liter sodium chlorite and about 0.1–50 (preferably 10) grams per liter sodium hydroxide, and is operated at 85–200 (preferably 170) ° F. Immersion times of 1 to 7 (preferably 4–6) minutes produce a desirable oxide layer. A desirable oxide layer typically exhibits a dark brown, almost black, color. A desirable oxide layer has a particular microscopic surface morphology and roughness, as will be described subsequently in relation to FIG. 5B.

After thorough water rinsing, the negative current collector metal is thereafter reduced, numeral 54. As used herein, "reduction" means the reverse of oxidation, the reacting of a metal oxide with a reducing agent to remove some or all of the oxide. Reduction may be accomplished by any operable approach. In the preferred approach, the reduction is accomplished by immersing the piece of the negative current collector metal in an aqueous solution comprising a reducing agent, preferably dimethylamineborane (DMAB). An operable reducing solution contains about 1–12 (preferably 5) volume percent DMAB in water solution at 12–14 pH. The reduction reaction is manifested by the production of gas bubbles at the surface of the negative current collector metal. The generation of gas bubbles diminishes as the reduction reaction progresses. An immersion time of approximately 2 minutes is generally sufficient to reduce most of the oxide. The negative current collector metal is thereafter thoroughly water rinsed and dried, preferably in an air circulating oven at 250° F. for 10 to 20 minutes.

The visual appearance of the oxidized negative collector metal is not substantially changed by the reduction process. An electrical resistance measurement may be used as an initial check that the desired reduction of the oxide has occurred. This resistance measurement is preferably performed with a pair of blunt electrodes, spaced approximately 1 centimeter apart, that rest lightly upon the negative current collector metal. Following the oxidation step, a rinsed and dried sample of negative current collector metal will exhibit an electrical resistance in the range of thousands of ohms. After an oxidized sample of negative current collector has been reduced in step 54, rinsed, and dried, it typically exhibits an electrical resistance of less than 1 ohm.

Figure 5A:
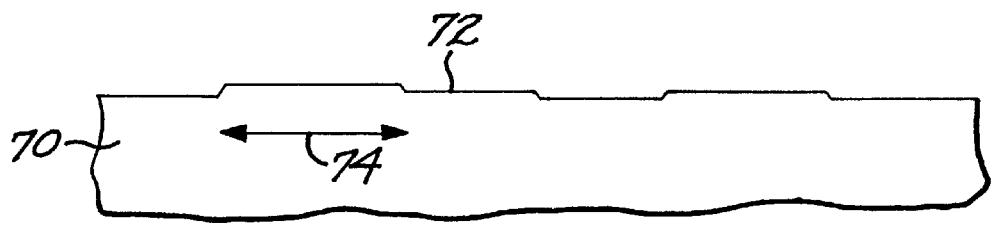
Figure 5B:
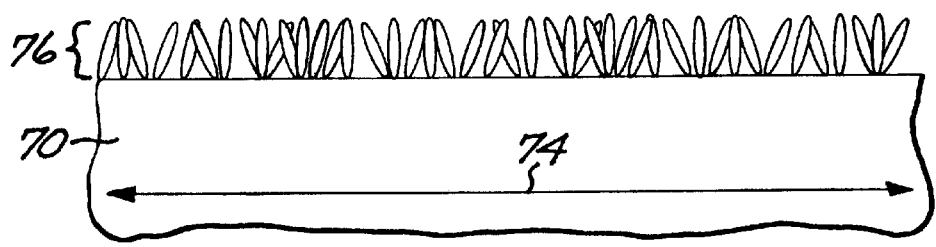
Figure 5C:
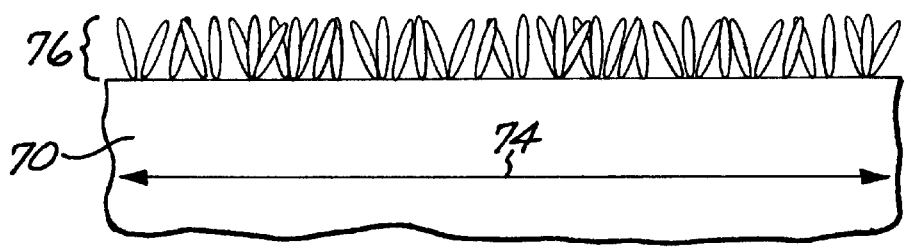

The oxidation process creates a surface that has a microscopic roughness that enhances adhesion to the negative active material. The reduction process retains this microscopically rough surface, but renders it electrically conductive. FIGS. 5A–5C schematically illustrate the structure of the copper negative current collector during the treatments of steps 51, 52, and 54. The as-provided piece of copper 70 has a copper oxide surface 72 that may have macroscopic scratches or rolling marks, but is relatively smooth on a microscopic scale, FIG. 5A. In FIGS. 5A–5C, a dimensional marker 74 indicates a grain diameter that is the same in each figure, approximately 10 micrometers in a typical case. FIGS. 5B and 5C thus are at depicted at a greater magnification than FIG. 5A. Etching step 51 cleans away surface contaminants and may produce a small increase in microscopic surface roughness, principally by revealing the grain structure of the copper. Oxidation step 54 produces a surface 76 that is principally cupric oxide (CuO) and has a morphology as illustrated in FIG. 5B. Reduction step 56 converts most of the oxide to metal, rendering it electrically conductive. As illustrated in FIG. 5C, reduction does not substantially change the microscopic morphology of the surface 76. Therefore, the resulting surface has both good adhesion to the negative active material 32a, and also good electrical contact to the negative active material 32a and low surface resistance.

The negative active material 32a is provided, numeral 56. The positive current collector 40 is provided, numeral 58. The positive active material 34a is provided, numeral 60. The separator 36 is provided, numeral 62. These components are prepared and assembled according to techniques well known in the art. For example, the negative active material 32a is hot rolled or hot pressed to the negative current collector 38, and the positive active material 32b is hot rolled or hot pressed to the positive current collector 40.

The components 38, 32a, 40, 34a, and 36 are prepared and assembled together in an appropriate container 22 and with the necessary electrodes 24, numeral 64, as in the manner illustrated in FIGS. 1–3, in preparation for the addition of the electrolyte. Further details of the preparation and assembly are set forth in the previously mentioned Bellcore U.S. Pat. 5,470,357, 5,456,000, and 5,429,891. The electrolyte 42 is provided and added to the container, numeral 66, to complete the fabrication of the battery cell assembly 20.

Negative current collectors with contacting negative electrode (anode) active material were prepared according to the preferred approach discussed above and evaluated. In one evaluation of the stability and electrical resistance at the negative current collector/negative electrode active material interface, specimens were immersed in the electrolyte for a period of 55 days. The interface resistance at the beginning of the test was less than 0.5 ohms, and at the end of the test was less than 0.5 ohms. The interface resistance was therefore quite low, and substantially unchanged after the 55 day exposure to electrolyte. In another evaluation, after preparation the test specimen was bent in some cases and subjected to a scraping or peeling in other cases, in an attempt to damage or remove some of the negative electrode active material. Microscopic examination of the deformed or scraped (peeled) specimens revealed that any observed failure had occurred primarily through the negative electrode active material rather than at the interface, indicating that the interfacial adhesive strength was greater than the cohesive strength of the negative electrode active material, the desired result.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of preparing a battery cell assembly, the method comprising preparing battery cell by steps of:
   providing a negative electrode, the step of providing the negative electrode including the steps of
      providing a negative-electrode active material that releases lithium ions upon discharging of the battery cell and accepts lithium ions upon charging of the battery cell, and
   providing a negative current collector contacting the negative electrode active material, the step of providing the negative current collector including steps of
      providing a piece of a negative current collector metal, thereafer oxidizing the piece of the negative current collector metal, and thereafter
      reducing the piece of the negative current collector metal;
   providing a positive electrode comprising
      a positive-electrode active material that accepts lithium ions upon discharging of the battery cell and releases lithium ions upon charging of the battery cell, and
      a positive current collector contacting the positive electrode active material;
   positioning a separator between the negative electrode and the positive electrode, the separator being electrically nonconductive to prevent contact between the negative electrode and the positive electrode but being permeable to lithium ions; and
   saturating the electrodes and the separator with an electrolyte to provide a lithium ion path between the negative electrode and the positive electrode.

2. The method of claim 1, wherein the step of providing the piece of the negative current collector metal further includes a step, after the step of providing and before the step of oxidizing, of etching the piece of the negative current collector metal.

3. The method of claim 1, wherein the step of oxidizing includes the step of
   immersing the piece of the negative current collector metal in an aqueous solution comprising an oxidizer.

4. The method of claim 1, wherein the step of oxidizing includes the step of
   immersing the piece of the negative current collector metal in an aqueous solution comprising sodium chlorite.

5. The method of claim 1, wherein the step of educing includes the step of
   immersing the piece of the negative current collector metal in an aqueous solution comprising a reducing agent.

6. The method of claim 1, wherein the step of reducing includes the step of
   immersing the piece of the negative current collector metal in an aqueous solution comprising dimethylamineborane.

7. The method of claim 1, wherein the negative current collector metal is copper.

8. The method of claim 1, wherein the positive current collector is made of aluminum.

9. The method of claim 1, wherein the negative-electrode active material comprises carbon.

10. The method of claim 1, wherein the positive-electrode active material comprises $LiCoO_2$.

11. The method of claim 1, wherein the separator comprises a polymeric material.

12. The method of claim 1, wherein the electrolyte comprises $LiPF_6$ in a 2:1 mixture by volume of ethylene carbonate and dimethyl carbonate.

13. The method of claim 1, wherein the battery cell assembly comprises at least two of the battery cells, wherein each battery cell is prepared by the approach recited in claim 1.

14. The method of claim 1, further including
    providing a container and placing the battery cell into the container.

15. A method of preparing a battery cell assembly, the method comprising preparing a battery cell by the steps for:
    providing a negative electrode comprising
       a negative-electrode active material that releases lithium ions upon discharging of the battery cell and accepts lithium ions upon charging of the battery cell, and
       a copper negative current collector contacting the negative-electrode active material, the negative current collector having a surface that is first oxidized and thereafter reduced;
    providing a positive electrode comprising
       a positive-electrode active material that accepts lithium ions upon discharging of the battery cell and releases lithium ions upon charging of the battery cell, and
       an aluminum positive current collector contacting the positive electrode active material;
    positioning a separator between the negative electrode and the positive electrode, the separator being electrically nonconductive to prevent contact between the negative electrode and the positive electrode but being permeable to lithium ions; and
    saturating the electrodes and the separator with an electrolyte to provide a lithium ion path between the negative electrode and the positive electrode.

16. The method of claim 15, wherein the negative current collector is produced by the steps of
    immersing the copper negative current collector in an aqueous solution comprising an oxidizer, and thereafter
    immersing the copper negative current collector in an aqueous solution comprising a reducing agent.

17. The method of claim 15, wherein the negative current collector is produced by the steps of
    immersing the copper negative current collector in an aqueous solution comprising sodium chlorite, and thereafter
    immersing the copper negative current collector in an aqueous solution comprising dimethylamineborane.

* * * * *